April 12, 1927.  W. LE R. BRYANT  1,624,211
MULTISPINDLE INTERNAL GRINDING MACHINE
Filed Aug. 18, 1923   9 Sheets-Sheet 3
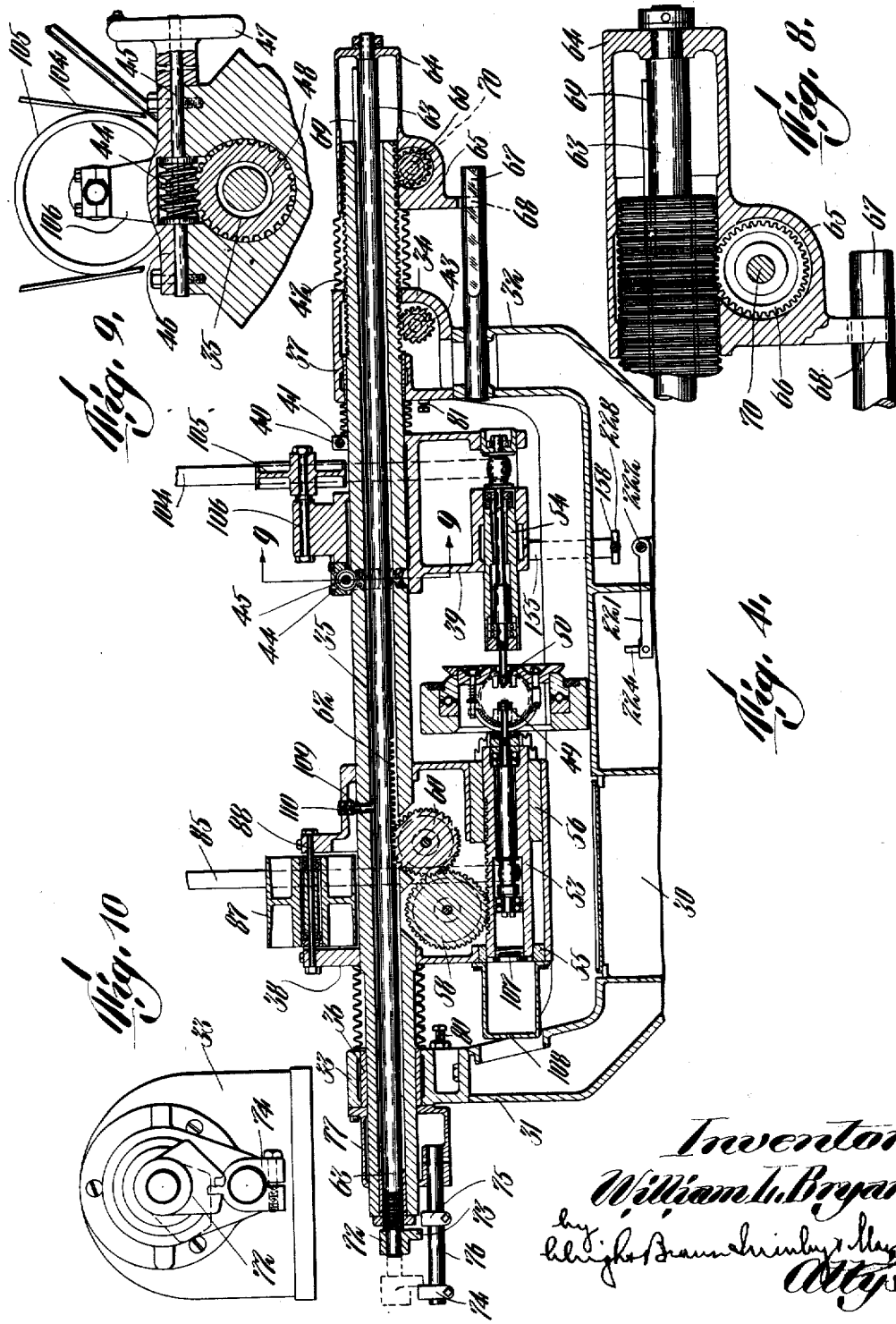
Inventor:
William L. Bryant

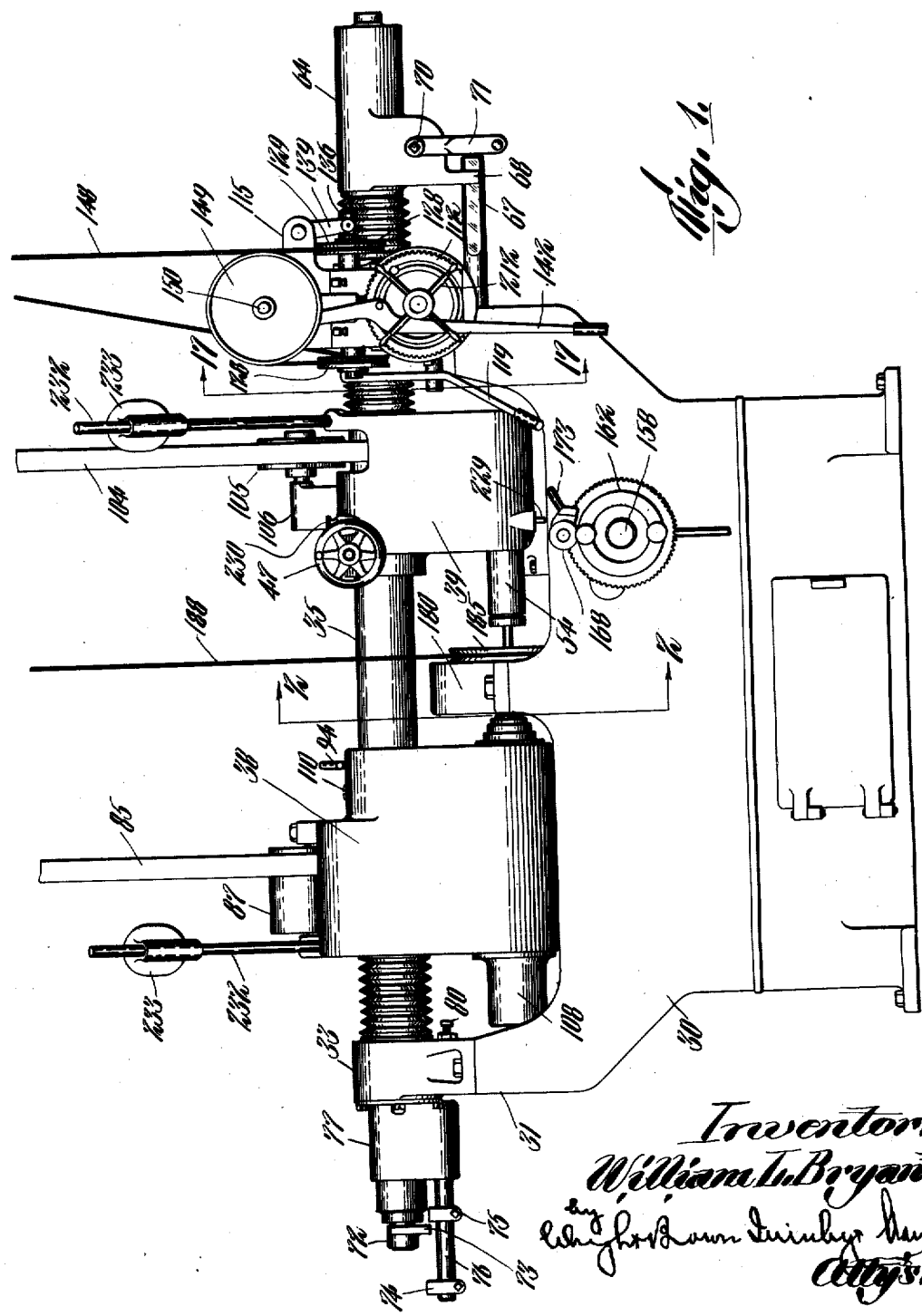

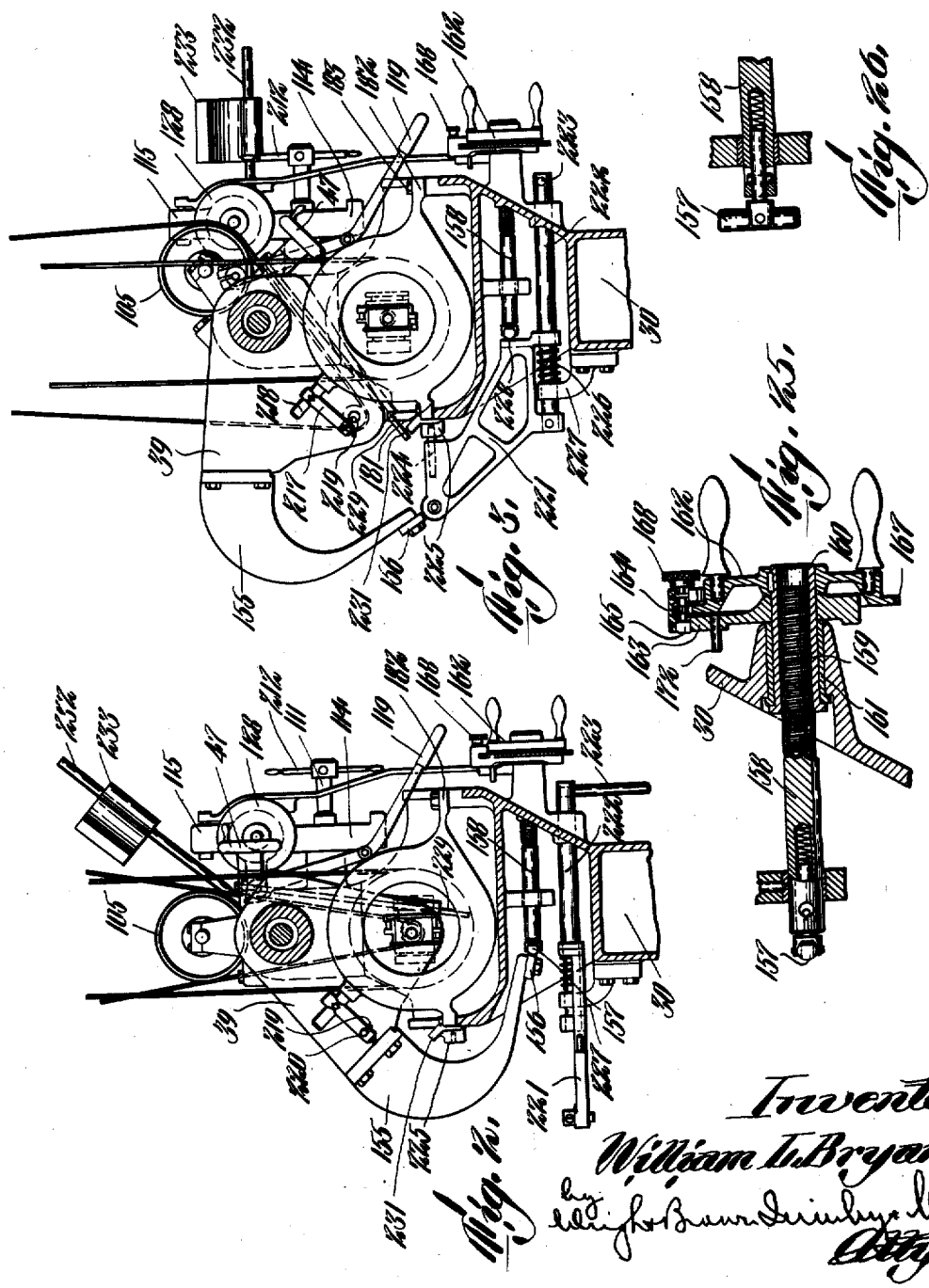

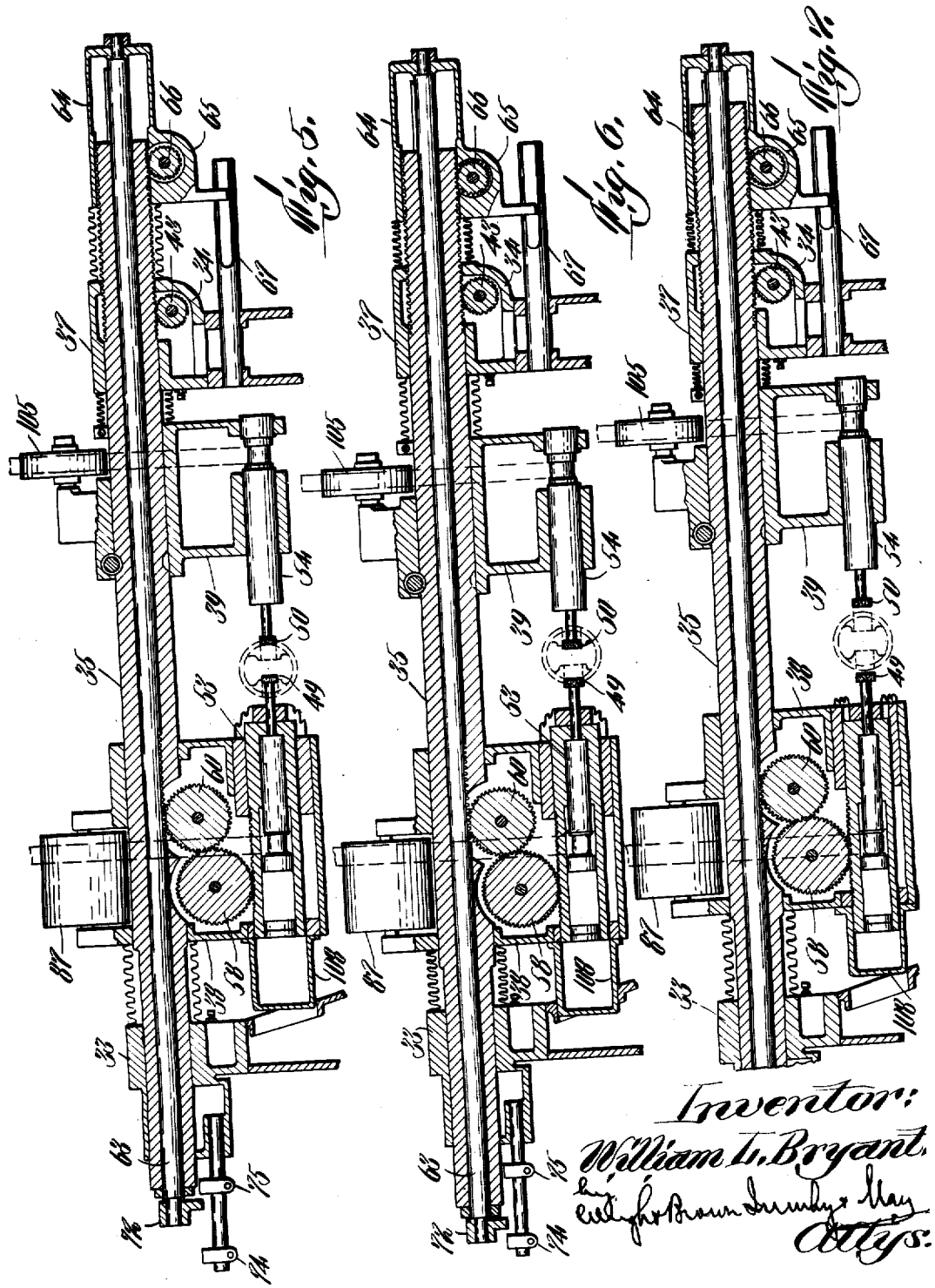

April 12, 1927.  W. LE R. BRYANT  1,624,211
MULTISPINDLE INTERNAL GRINDING MACHINE
Filed Aug. 18, 1923  9 Sheets-Sheet 5
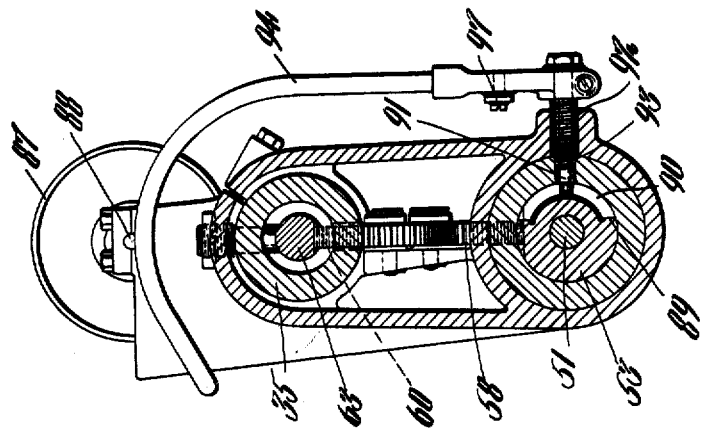
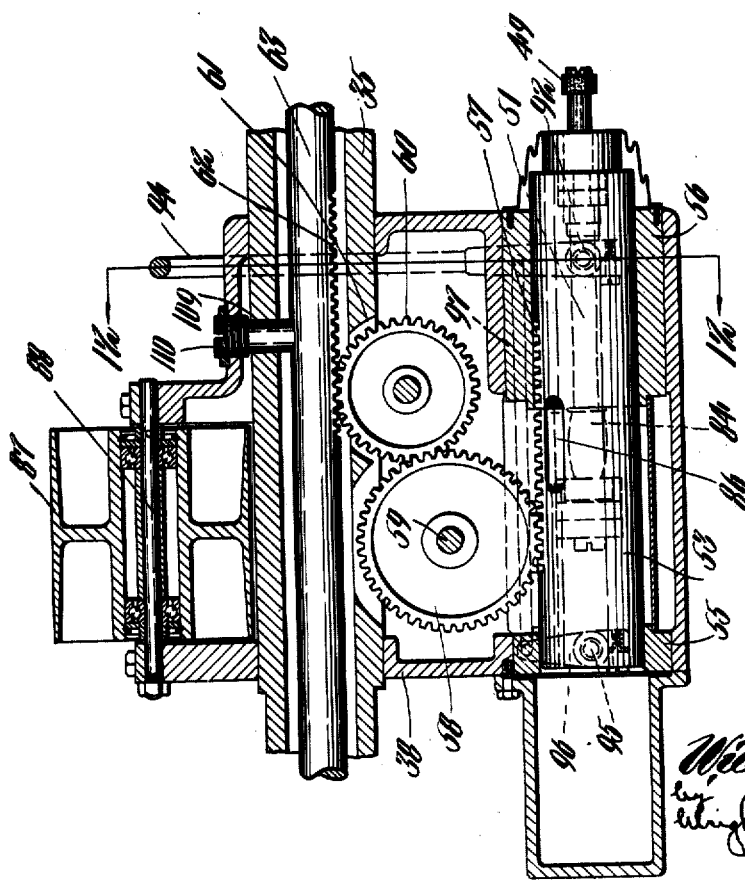
Inventor
William L. Bryant April 12, 1927.  W. LE R. BRYANT  1,624,211
MULTISPINDLE INTERNAL GRINDING MACHINE
Filed Aug. 18, 1923   9 Sheets-Sheet 6
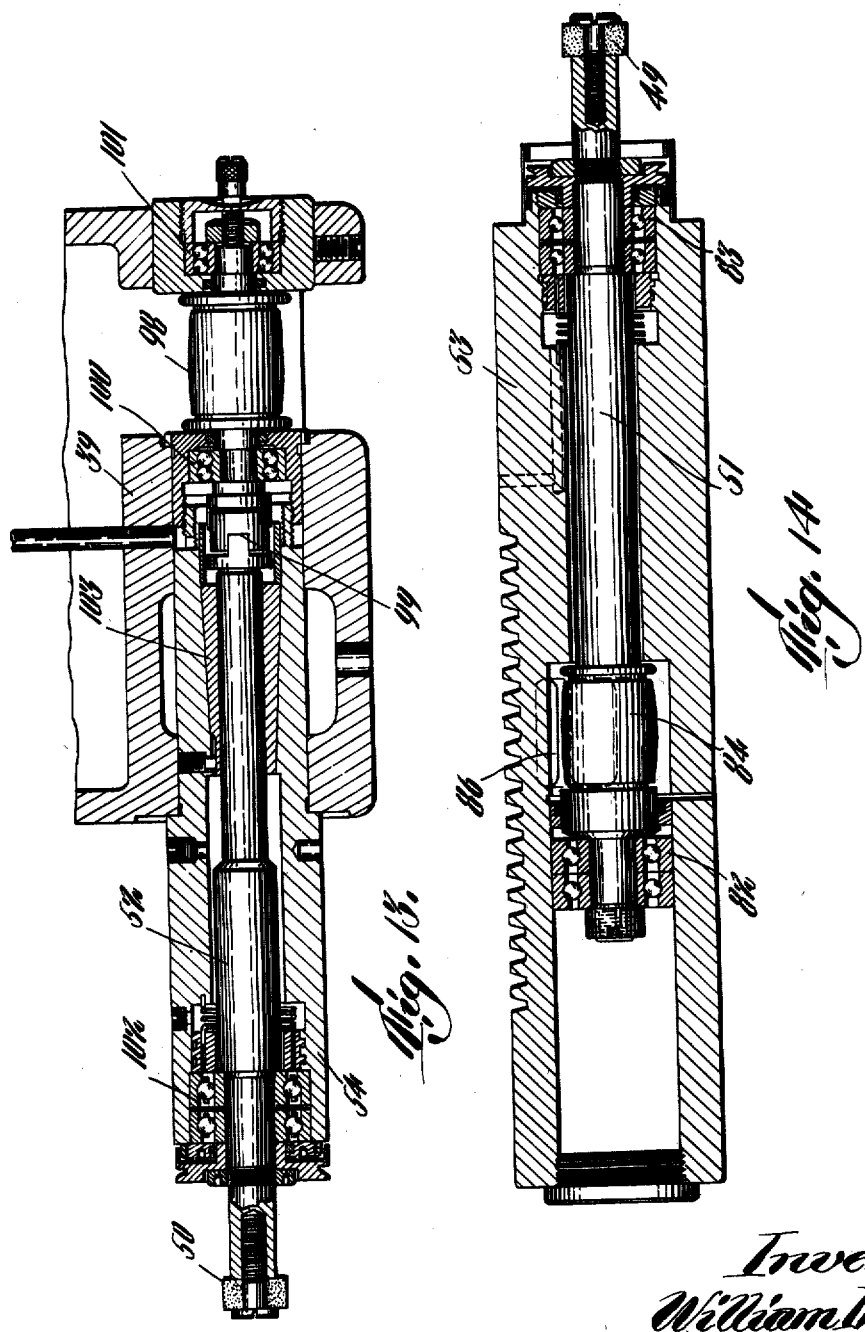
Inventor:
William L. Bryant.

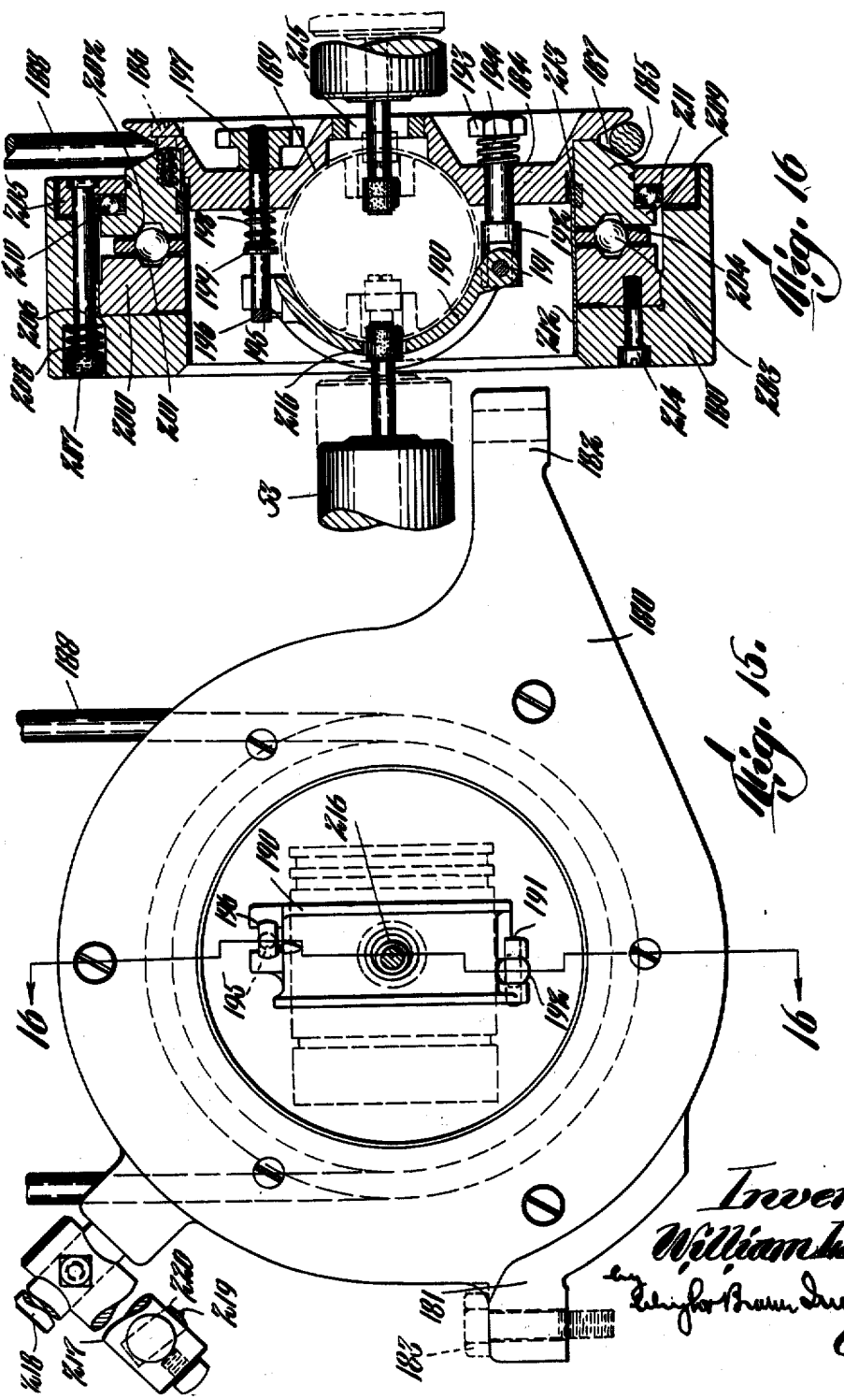

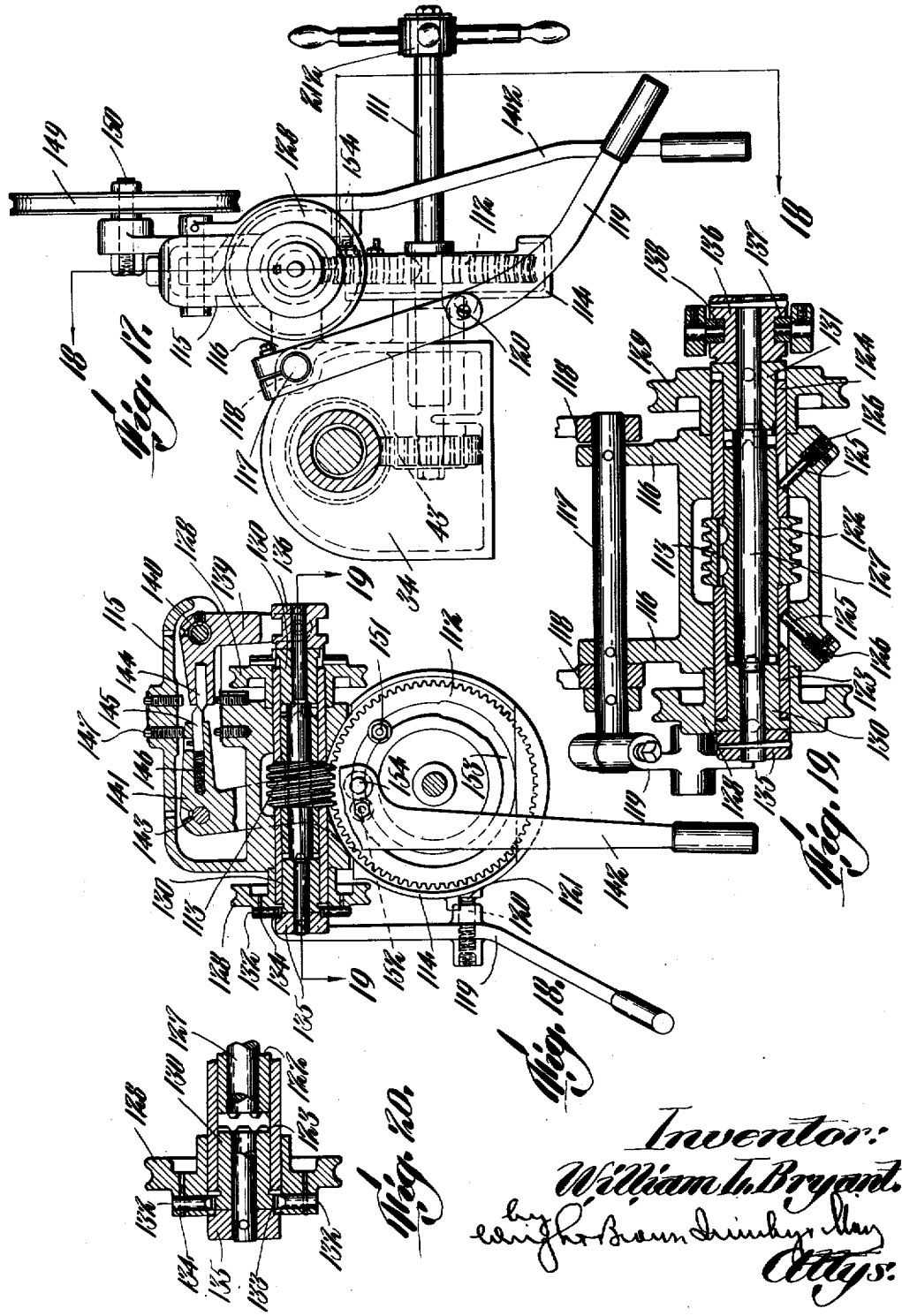

April 12, 1927.
W. LE R. BRYANT
1,624,211
MULTISPINDLE INTERNAL GRINDING MACHINE
Filed Aug. 18, 1923   9 Sheets-Sheet 9
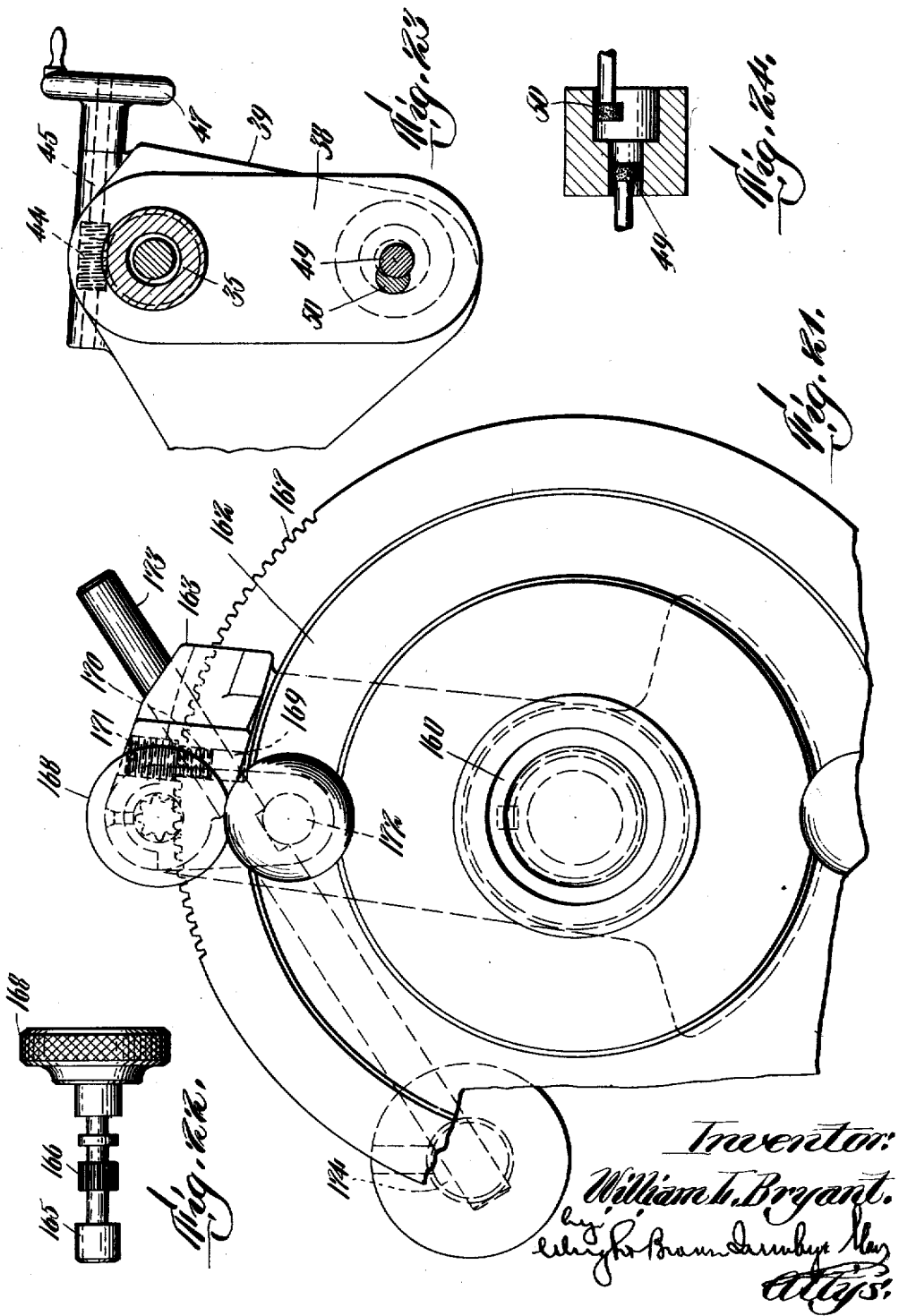

Patented Apr. 12, 1927.

1,624,211

UNITED STATES PATENT OFFICE.

WILLIAM LE ROY BRYANT, OF SPRINGFIELD, VERMONT.

MULTISPINDLE INTERNAL-COMBUSTION MACHINE.

Application filed August 18, 1923. Serial No. 658,057.

This invention has relation to internal grinding machines and has for its object to provide a machine in which a pair of grinding wheels may be utilized for simultaneously grinding the surfaces of holes or bores located in opposite portions of the work, as, for example, in a piston such as employed in combustion engines, wherein it is desirable to grind the bearings which are formed in the opposite sides thereof to receive the wrist pin. It is also desirable, in grinding work of this general character, that the grinding operation performed upon the internal surfaces of the bore or apertures should be accomplished without change in position of the work. By employing a pair of grinding wheels which are oppositely arranged and which may be fixed in position relatively to each other with the work between, it is possible to grind the work on both sides thereof without changing the position of the work or the relative positions of the grinding tools. Where the internal surfaces to be ground have the same diameter, the grinding wheels should be adjusted so that their axes are coincident. According to the present invention, two grinding wheels are employed which are preferably supported upon the same slide, so that, when the slide is reciprocated, the grinding wheels are moved in the same direction axially.

A further object of the invention is to provide a machine in which the work may be rigidly supported between the tool carriers and rotated about the axis of the apertures the walls of which are to be ground. In accomplishing these general objects, additional objects of the invention are to provide other improvements by which the grinding machine is rendered highly accurate in operation under stable control.

On the accompanying drawings,—

Figure 1 illustrates in front elevation a machine embodying the invention.

Figure 2 represents a section on the line 2—2 of Figure 1, looking from left to right and showing the tool carrier in grinding position.

Figure 3 represents a section on the same line but showing the tool carrier removed to an inactive position.

Figure 4 represents a vertical longitudinal section through a portion of the machine and illustrates the main slide which supports the tool carrier.

Figures 5, 6 and 7 represent similar sections, the work holder being omitted, and illustrate the operation of the grinding tools upon the work and several of the positions which may be occupied by the grinding tools.

Figure 8 represents in section a portion of the mechanism for effecting the separation of the tools.

Figure 9 represents in section on the line 9—9 of Figure 4 the mechanism for effecting a rotative movement of one of the tool carriers relatively to the other about the axis of the main tool slide.

Figure 10 represents in end elevation the tool slide and the stop mechanism which assists in effecting the separation of the grinding tools.

Figure 11 represents in section one of the tool carriers which is mounted upon the slide and illustrates mechanism for effecting a bodily longitudinal adjustment of the grinding tool supported thereby.

Figure 12 represents a section through the same on the line 12—12 of Figure 11.

Figure 13 represents a longitudinal section through the other tool carrier taken on the axis of the tool spindle.

Figure 14 shows a section through the tool spindle sleeve which is illustrated as a whole in Figure 11.

Figure 15 represents in face view (looking lengthwise of the machine) of the work holder.

Figure 16 represents a section through the same on the line 16—16 of Figure 15.

Figure 17 represents, detached, the mechanism for effecting a longitudinal traverse of the main slide.

Figure 18 represents a section through the same on the line 18—18 of Figure 17.

Figure 19 represents a section on the line 19—19 of Figure 18, but on a somewhat larger scale.

Figure 20 illustrates in section details of one of the clutches included in the mechanism shown in Figure 19.

Figure 21 represents on a large scale a front elevation of a portion of the mechanism for effecting the relative cross-feed of the grinding tools and the work.

Figure 22 illustrates a manually-rotatable pinion which is employed in the cross-feed mechanism for effecting a fine feed of the tools.

Figure 23 is a detail view, more or less diagrammatic, for the purpose of illustrating how the tool carriers may be angularly adjusted relatively to each other for grinding bores of different diameters.

Figure 24 illustrates the relative position of the tools in reference to the work when the carriers are adjusted to the position shown in Figure 23.

Figures 25 and 26 illustrate details in the cross-feeding mechanism for the tool carriers.

Before attempting to describe in detail the machine which is illustrated on the drawings thus briefly referred to, I desire to have it understood that the machine represents but one embodiment of the invention which is capable of many others; that many changes may be made in the structural arrangement and in the details of the machine herein described without departing from the spirit and scope of the invention as defined in the claims; that the phraseology which has been herein employed is for the purpose of description and not of limitation; and that the drawings are more or less diagrammatic or conventional.

In general, it is my intention or purpose to provide an internal grinding machine in which oppositely-arranged tools are afforded for grinding a bore or bores of the same or different diameters, in which the tools have a relative rigidity of support and are accurately controlled so as to effect a precision in operation. In accomplishing this result, I preferably employ tool carriers which are mounted upon the same slide. This slide preferably takes the form of a bar which is mounted in bearings, so as not only to slide therein but also to be capable of a rotative movement for the purpose of effecting the cross-feed of the tools relatively to the work. By virtue of this construction, it is also possible to effect an angular adjustment of the tool carriers one relatively to the other so as to bring the axes of the tool spindles into coincidence or to have the axes of the spindles in parallel lines according to the character of the form to be operated upon. By supporting the tool carriers upon the slide and reciprocating the slide to impart the necessary traverse to the tools, the work may be ground with great precision such as cannot be accomplished where the tool carriers are mounted upon separate slides. Preferably the two tool carriers are relatively movable towards and from each other to effect a separation and an approach of the tools, thereby affording the easy removal and replacement of work between them, and in addition it is also desirable in many instances that the tool spindles themselves may be relatively adjustable toward and from each other to accommodate work of different thickness which is placed between them. After these various adjustments have been secured, the tools may move as a unit both in the traverse of the tools and in the cross-feed thereof. The machine, which is illustrated on the drawings, possesses these features of construction and relative arrangement as will be explained more at length in the specification.

The relative position of the tools and the work is controlled by a template-controlled mechanism, the details of which are not dissimilar from those illustrated in my Letters Patent No. 1,051,483, dated Jan. 8, 1913, which in that instance is utilized for controlling the position of a single tool carrier.

In the machine which I have herein illustrated, the work is supported by the bed of the machine, it being placed in a work holder rotatable in a work carrier which may be permanently secured to the bed, and means are afforded for effecting the rotation of the work holder. The construction of the work holder depends to some extent upon the character of the work on which the tools are to operate, and I have selected for illustration one form of tool holder comprising a ring-like chuck which is controlled in position both axially and diametrically by a face bearing, as will be subsequently explained.

Referring more particularly to the machine illustrated in the drawings, it is shown as being provided with a bed of any suitable character indicated at 30. This may be of box or cabinet type and be provided with the necessary liquid receptacles and pumps for supplying liquor to the grinding tools. As these are common attachments of grinding machines, I have not undertaken to illustrate them. At its ends, the bed is provided with two upright portions 31, 32 upon which are rigidly clamped brackets 33, 34, in which is mounted the main tool slide 35. This slide, as previously indicated, consists of a bar (shown as cylindrical and tubular) which is mounted to slide in bearings 36, 37, in the brackets 33, 34. Upon this bar are placed or hung the two tool carriers which are indicated as a whole at 38 and 39 respectively. These two carriers are relatively movable toward and from each other and are relatively rotatably or angularly adjustable about the axis of the bar 35. The mechanism for accomplishing this will now be explained. The two carriers are preferably hollow and of substantial construction, and each has an elongated bearing upon the slide 35. The tool carrier 38 is clamped upon the slide 35 so that it may receive minor adjustments both axially of the slide and rotatably thereabout in setting up the machine. After being properly located in position, it is clamped tight to the slide. The tool carrier 39 is placed in a somewhat similar manner upon the slide 35, and it too is clamped thereon. A portion of its bearing, as indicated at 40, is split and is drawn together by a clamping bolt 41 which is operated manually. The main slide 35 is provided on its right-hand end with a circular rack, as shown in Figure 4, with which is engaged a pinion 43 housed on the hollow bracket 34. Obviously, by rotating this pinion in one direction or the other, the cylindrical slide bar and the tool carriers thereon may be reciprocated axially of said slide bar. This may be accomplished by hand or by automatic power mechanism subsequently to be explained.

For effecting a positive relative angular adjustment of one of the tool carriers relatively to the other about the axis of the bar, one of the tool carriers, as illustrated in Figure 9, is provided with a worm 44 secured upon a spindle 45 mounted in the carrier and held in place by a bearing cap 46. The spindle at the front end, so as to be accessible from the front of the machine, is provided with a hand wheel 47 for effecting the rotation of the worm. The worm 44 meshes with a worm wheel 48 formed by cutting appropriate teeth in the slide bar 35, and hence, by rotating the hand wheel 37 in one direction or the other after loosening the clamp 41, the tool carrier 39 may be angularly adjusted relatively to the tool carrier 38. This mechanism is operated manually only when it is desired to effect the relative adjustments angularly of the two tool carriers, and ordinarily the clamping bolt 41 is screwed home so as to clamp the tool carrier 39 rigidly upon the cylindrical slide bar 35. In Figure 23, which is a more or less diagrammatic illustration of the two tool carriers, it will be observed that one of the carriers has been angularly adjusted so that the tool spindle carried thereby is out of exact axial alinement with the tool spindle of the other carrier although they may be regarded as substantially alined. When thus relatively adjusted, the two tools may be caused to operate on the walls or bores of different diameters of the work as shown in Figure 24.

For operation on the work, it is desirable, in order that the grinding surfaces of the tools may not wholly leave the surfaces being ground in the traverse of the main slide, that the tools considered as a whole may be adjusted axially relatively to each other, so that, after the work has been placed in the work holder, the tools which were previously separated may be advanced one toward the other into operating position. To this end the tools, which are indicated at 49 and 50, are mounted on spindles 51, 52, respectively, whose axes are radially equidistant from the axis of the bearings of the main tool slide, and these spindles are in turn journaled in sleeves 53, 54, which for convenience may be termed tool holders or spindle holders. The tool carriers 38, 39 take the form of hollow arms which extend radially from the slide bar 35, and in their outer ends are mounted the two sleeves or spindle holders 53, 54, the axes of the sleeves being at the same radial distance from the axis of the slide bar. While both of the spindle sleeves 53, 54 might be mounted in the carriers so that both are axially adjustable therein, as a matter of practice this is not essential, as the axial adjustment of one of said sleeves serves all of the necessary purposes. Consequently, while the spindle sleeve 54 is preferably fixed in the tool carrier, the sleeve 53 is mounted in bearings 55, 56 in the tool carrier 38 so that it is capable of sliding therein. The sleeve 53 is formed with a rack 57 (see Figures 4 and 11) which is engaged by a gear 58 housed within the hollow tool carrier 38 and loosely mounted upon a shaft 59. This gear in turn meshes with a gear 60 likewise housed in the hollow tool carrier but projecting through a slot 61 in the cylindrical slide bar 35 into engagement with a rack 62 formed on a rod 63 which extends through the bore of the cylindrical tool slide 35. By reason of this construction, it will be obvious that a relative axial movement of the rod 63 and the main tool slide 35 will cause the transmission of power through the gears 60 and 58 to the tool spindle 53 so as to move the latter axially in one direction or the other. The rod 63 is longer than the cylindrical slide bar 35 and projects beyond both ends thereof, as illustrated in Figure 4. At its right-hand end, the rod 63 is provided with a tubular cap member 64 which telescopes the end of the slide bar 35. This cap member has a downwardly-projecting portion 65 in which is housed a pinion 66 which meshes with the circular rack 42 on the slide bar. The cap member is held from rotation by a guide 67, which is illustrated as a short bar extending from the upright 32 at the end of the bed, said cap member being provided with lugs 68 which straddle the bar as shown. It may be said in passing that the rod 63 is splined to the cylindrical slide bar 35 so that they are held against relative rotative movement, the spline being indicated at 69. The gear 66, which is carried by the cap member 64, has the end of its shaft 70 extending forwardly and squared so that it may be rotated manually by a handle 71. Consequently, when the handle 71 is moved by the operator to rotate the pinion 66, clockwise for example in Figure 4, the rod 63 will be moved longitudinally to the left, and, through the gears 58 and 60, the tool spindle sleeve 53 is likewise moved to the left so as to separate the tool 49 from the tool 50. During the traverse, however, of the main tool slide 35 as effected by the gear 43, there is no relative movement of the rod 63 and the tool slide, and consequently there is no independent movement of the tool 49 and the tool-spindle sleeve 53. It is only when it is desired to separate the tools axially or to bring them towards each other that the gear 66 is operated manually.

It will be noted that, on the left-hand end of the bar 63 which projects beyond the end of the tool slide 35, said rod is provided with a collar 72 having a depending finger 73 located between two abutments or stops 74, 75, mounted upon a rod 76 which is supported by the bracket 33. As a detail of construction, the rod 76 may be secured to a hollow guard 77 which is bolted to the bracket 33 on the bed. The rod 76 is stationary. Consequently, when the gear 66, which effects a relative movement of the bar 63 and the main tool slide 35, is rotated clockwise to such an extent that the finger 73 engages the stop 74 for example, the movement of the bar 63 will cease and the continued rotation of the gear 66 will effect the movement of the slide bar 35 to the right. This has the effect of still further effecting the withdrawal of the tool-spindle sleeve 53 into the carrier 38, but at the same time it moves both the carrier 38 and the carrier 39 to the right, whereupon the tool 50 is moved to the right to separate it from the tool 49 and to clear the work. It will thus be seen that, although only one of the tool-spindle sleeves is movable in its carrier, yet the result of this operation is to cause the movement of both of the tools in opposite directions away from each other. Conversely, when the gear 66 is rotated anti-clockwise to move the bar 63 to the right, the tool-spindle sleeve 53 is moved to the right to advance the tool carried thereby, until finally the finger 73 engages the stop 75 on the bar 76, whereupon both tool carriers are moved to the left so as to advance the tool 50 into the work, the retrograde movement of the carrier 38 being compensated for by the continued advancing movement of the tool-spindle sleeve 53.

In Figures 5 and 6, I have shown the limits of normal traverse of the tool slide and the tools carried thereby for the particular piece of work being operated on, namely a cylinder for combustion engines; but in Figure 7 I have shown the tools in their separated positions at which they are disengaged from the work so as to permit the removal of the work and the replacement of a new piece of work. The traversing movements of the slide 35 and the relative movement of the tool carriers thereon are limited by two adjustable stop screws 80, 81, taking into apertures in the brackets 33, 34, as shown in Figure 4. These are called into operation only when the tools are being separated by hand through the intermediacy of the handle 71 and the gear 66.

The tool spindles are of course rotated, and, for this purpose, any suitable mechanism may be employed. In Figure 14, the tool spindle, which is supported by the carrier 38, is journaled as previously stated in the sleeve 53. Any suitable form of antifriction bearings which supports the spindle at or near its ends may be employed. Bearings for the purpose are indicated at 82 and 83. It is unnecessary to describe further the exact construction of the details for the mounting of the spindle. The spindle is shown as being provided with a pulley 84 which is housed within the sleeve 53, and the belt 85 which drives the pulley passes through slots 86 formed in the sides of the sleeve. The belt 85 may be driven from a counter-shaft and its stretches engage an idler pulley 87 which is journaled by antifriction bearings on a shaft 88 secured in the upper portion of the tool carrier 38. The idler pulley 87 is of sufficient length axially to provide for the independent axial movement of the spindle sleeve 53. The spindle sleeve 53 is mounted in the bearings 55, 56, as previously stated, but it is held rigidly against movement therein during the operation of the tools upon the work. For this purpose, the sleeve 53 is provided with a circumferential recess 89 on one side thereof, as shown in Figure 12, to receive a curved shoe or clamp 90 which is engaged by a radial pin 91. Into a threaded aperture in the carrier 38 there is passed a screw 92, and between the inner end of the screw and the pin 91 there is a spring 93. When the screw 92 is rotated by a handle 94 in the proper direction, the clamp 90 is pressed firmly against the walls at the end of the recess 89 in the sleeve 53 so as to hold the same firmly, not only against rotative movement but against independent axial movement. A screw similar to that at 92, as indicated at 95, is passed into the carrier 38 and through the bearing 55 so that its end may engage the sleeve 53, as indicated in dotted lines in Figure 11. The outer end of the screw is provided with an arm 96 connected by a link 97 with the handle 94 which is secured to the screw 92, so that, when the handle 94 is oscillated in one direction or the other, the two clamping screws 92, 95 are simultaneously rotated in one direction or the other to clamp or unclamp the ends of the sleeve 53.

The spindle 52, which carries the tool 50, is journaled as previously stated in the sleeve 54. This sleeve 54 is secured in the end of the tool carrier 39 and the spindle is driven by a pulley 98. In this case, the spindle is made in two sections connected by a coupling 99, and each section of the spindle is supported in anti-friction bearings, those for the pulley-carrying section of the spindle being indicated at 100 and 101, and the bearings for the tool-carrying portion of the spindle being indicated at 102 and 103, the latter 103 being a tapering sleeve. The pulley 98 is driven by a belt 104 from a suitable countershaft, the stretches of the belt engaging an idler pulley 105 mounted to rotate about a shaft 106 projecting laterally from an upper portion of the tool carrier 39. It will be understood, of course, that the parts mounted upon the tool carriers are properly mounted and protected against grit and particles of metal. In this connection I may advert to the fact that, for the purpose of protecting the spindle sleeve 53 which is tubular, its rear end is closed by a screw cap 107, and that the carrier is provided with a hollow guard 108 into which the end of the sleeve projects when it is moved away from the work. Before passing to a description of other features of the machine, I may call attention to one small structural detail by which the bar 63 is held against bending between its ends due to the engagement of the gear 60 with the rack 62, this comprising an abutment pin 109 which engages the side of the bar diametrically opposite the rack and which is adjusted by a screw 110.

The main cylindrical tool slide 35 may be operated to cause the traverse of the tools either manually or by power. I have already stated that said slide is reciprocated by a pinion 43 engaging the circular rack 42 thereon. This pinion 43 is secured upon the inner end of a shaft 111 (see Figure 17), which is journaled in a bearing afforded by the bracket 34 and which projects forwardly so as to receive a hand wheel 212 within convenient access for the operator. Obviously, by rotating the hand wheel in one direction or the other, the main tool slide moves back and forth. The shaft 111, however, may be rotated first in one direction and then in the other by power mechanism, which in the present instance may comprise a worm wheel 112 secured to the shaft, and a worm 113 which is rotated automatically first in one direction and then in the other. The worm wheel 112 is located within an open front housing 114 secured to the front of the bracket 34. The worm 113 may be bodily moved to engage it with and disengage it from the worm wheel 112. For this purpose, there is a frame indicated as a whole at 115 having arms 116 pinned to a rock shaft 117 journaled in lugs 118 projecting forwardly from the bracket 34. A handle 119 is secured to the end of the shaft 117 so that the operator may rock the shaft 117 and swing the frame 115 upwardly to disengage the worm from the worm wheel. The handle 119 has a spring-pressed pin 120 adapted to engage a stop pin 121 on the side of the housing 114, so that, when the frame is swung downwardly to cause the engagement of the worm 113 with the worm wheel, the arm will be yieldingly locked in position. When the handle is drawn forwardly and upwardly by the operator, the pin 120 rides over the pin 121, and then holds the frame sufficiently elevated so that the worm will not engage the worm wheel. The worm 113 is keyed upon a sleeve 122 which in turn is journaled within bearing sleeves 123, 124, as shown in Figures 18 and 19. These two sleeves hold the worm against axial movement, being themselves held against outward axial movement by abutment pins 125 and screws 126 arranged at an angle of 45° to the said sleeves and engaging shoulders at the ends of recesses therein. These devices act not only to prevent axial movement of the bearing sleeves and the worm but also hold the sleeves against rotation. Extending loosely through the sleeve or quill 122, there is a shaft 127 to the ends of which are attached oppositely-driven pulleys 128, 129. These pulleys are pinned to clutch members 130, 131, respectively, which are adapted to alternately engage clutch members or clutch teeth formed on the ends of the sleeve or quill 122. By moving the shaft 127 axially in one direction or the other, the clutch 130 or the clutch 131 will be engaged with the sleeve or quill 122 so as to rotate the worm 113 in one direction or the other. Inasmuch as the two pulleys 128, 129 are attached to the clutch members 130, 131 in the same way, a description of the means for attachment of one will suffice for both. In Figure 20, the hub of the pulley 128 is illustrated as being provided with two diametrically-arranged radial pins 132, the beveled inner ends of which extend into keyways 133 formed in the clutch member 130, and the pins 132 are secured in place by cross-pins 134. On one end of the shaft 127, there is pinned a collar 135 and on the opposite end is pinned a collar 136, the latter having a peripheral groove 137 to receive shoes 138 pivoted on the bifurcated end of a right-angle lever 139 by which the shaft 127 may be reciprocated to operate the clutch members. The last-mentioned lever 139 is fulcrumed on a shaft 140 carried by the frame 115. This lever is in turn oscillated in one direction or the other by another right-angle lever 141, the longer arm of which terminates in a handle 142 by which it may be manually moved. The last-mentioned lever 141 is fulcrumed on a shaft 143 so that its shorter arm extends toward the shorter arm of the lever 139. The lever 139 has a beveled pin 144 engaged by a similarly beveled pin 145 arranged in a socket in the shorter arm of the lever 141, and is pressed yieldingly outward by a spring 146.

Assuming the parts to be in the position shown in Figure 18, when the handle 142 is swung to the left so as to swing the shorter arm of the lever 141 downwardly, the beveled end of the pin 145 rides over the beveled end of the pin 144 until it passes the end of the pin, whereupon the spring 146, which in the meantime has been compressed, thrusts the pin 145 forwardly so as to wedge the lever 139 in the direction to force the clutch-operating shaft 127 to the left so as to engage the clutch 131 with the end of the quill or sleeve 122, thereby causing the worm to be rotated in the same direction as the pulley 129 with which it is now clutched. Similarly, when the handle 142 is swung to the right from the position in which it is last moved, the lever 139 is operated to move the clutch-operating shaft 127 to the right so as to cause the disengagement of the clutch member 131 from and the engagement of the clutch member 130 with the quill or sleeve 122 so that the worm will be driven in the opposite direction by the pulley 128. Suitable abutment screws, of which there is a pair for each of the levers 139, 141, are arranged to limit the movement of said levers, these abutment screws being indicated at 147. The pulleys 129 and 128 are driven by a single round belt 148, which, after passing around them, is conducted over an idler pulley 149 journaled on a stud shaft 150 projecting forwardly from the frame 115. The handle 142 of the clutch-shifting lever 141 is automatically oscillated by stops 151, 152 carried by the worm wheel 112 as shown in Figure 18. These stops are adjustably set in a circular undercut groove 153 formed in the exposed face of the worm wheel, and they are adapted alternately to engage a pin 154 on the lever 141. As the worm wheel reaches the limit of its rotation in one direction, one of the stops 151 engages the pin 154 to move the clutch-shifting lever in the same direction, thereby effecting the reverse rotation of the worm and of the worm wheel until the other stop 152 engages the pin 154 and swings the lever in the opposite direction. The length of traverse of the main tool slide may be varied by adjusting the stops 150, 152 in the groove 153 in which they are located.

As previously stated, the main cylindrical tool slide is moved about its axis to effect the cross-feed of the tools relatively to the work, and at the same time, however, the tool carriers must be guided accurately during the longitudinal traverse thereof. To one of the tool carriers, namely that indicated at 39, there is rigidly secured a curved arm 155, to the extremity of which there is secured an elongated template 156. During the operation of the machine, the edge face of the template rests against a shoe 157 carried by a bar 158 as shown in Figures 2, 25 and 26. In the event that the bores to be ground are cylindrical, the template 156 has an edge face which is exactly parallel with the axis of said bores, but, if the bores are to be ground tapering, a template is employed with an edge face which is at an angle to the axis of the bore. The weight and the center of gravity of the carriers are such that the template 156 bears firmly against the shoe 157, and hence, by adjusting the bar 158 on which the shoe is mounted, the tool carriers and the slide on which they are mounted may be adjusted angularly about the axis of said slide. Any suitable mechanism may be utilized for adjusting the bar 158 lengthwise, the mechanism which I employ being convenient for the purpose. The bar 158 is threaded as at 159 and enters a nut sleeve 160 which is mounted in a bearing sleeve 161 located in a suitable aperture formed in the front wall of the bed 30, as shown in Figure 25. A hand wheel 162 is keyed to the projecting end of the nut so that the latter may be rotated by hand to advance or retract the screw bar 158 and thus move the tool carriers in one direction or the other about their axes. There is loosely journaled on the nut sleeve 160 an arm 163 having at its outer end a lip 164 which projects over the hand wheel 162. Journaled in this lip portion there is a shaft 165 having a pinion 166 which engages the toothed flange 167 of the hand wheel 162. The end of the shaft 165 is provided with a knurled knob 168 by which the shaft may be rotated to effect a fine feed of the screw bar 158. This pinion and shaft 165 ordinarily hold the wheel 162 and the arm 163 against relative movement, but, to assist in preventing relative movement of the parts except when the knob 168 is rotated, there is a spring-pressed pin 169 carried by the lip 164 which engages the periphery of the wheel 162, as shown in Figure 21. The spring for the pin 169 is indicated at 170 and its outer end engages a screw 171 passed into a threaded aperture in the lip. When the shaft 165 is rotated manually to effect a rotative movement of the wheel 162 relatively to the arm 163, the latter must be held against rotation. For this purpose, the arm 163 is provided with a pin 172 which may be engaged with a notch in a swinging handle 173, the fulcrumed end of which is mounted in a stud 174 mounted in an aperture in the front wall of the bed. I have not shown any mechanism for effecting the automatic rotation of the wheel 162 or the arm 163, but may utilize for that purpose substantially the same mechanism as illustrated in my said Letters Patent No. 1,051,483, dated Jan. 8, 1913. As the machine is illustrated, the operator, by rotating the hand wheel 162, effects the cross-feed of the tool carriers and the tools thereon, and, when the main cross feed has been accomplished, the operator effects the fine finishing feed by first engaging the handle bar 173 with the pin 172 and then rotating the knurled knob 168 so as to rotate the wheel 162 and the nut 159 relatively to the arm 163.

The work holder, which is employed in the machine herein illustrated, is of course selected and adapted for the particular character of the work to be ground, and it is mounted in a work carrier or support which is firmly fixed to the bed so as to locate the work between the two tools. The work carrier in the present instance comprises a saddle 180 having forwardly and rearwardly projecting arms 181, 182 (see Figure 15), which are bolted or otherwise secured to the front and rear walls of the bed of the machine. It is quite evident that the saddle may be secured in such wise to the bed that it is capable of adjustment lengthwise of the tool spindles or crosswise of the bed as may be desired, but, for the purpose of illustration, I have shown the arms of the saddle as being bolted to the bed by bolts 183 which may be passed into appropriate threaded apertures of which there may be a series. Except for its arms 181, 182, the work carrier is illustrated as being approximately circular in face view and is ring-like or annular so as to afford a bearing for the work holder. In the present instance, the work holder is in the form of a relatively flat disk or annulus 184 having as a component part thereof an annular ring or flange 185 secured thereto by screws 186. The work holder is formed with a groove 187 in its periphery to receive a round belt 188 by which it is driven, said belt itself being driven from a counter-shaft or other suitable source of power. The work holder in the present instance is so formed as to receive and hold a cylindrical object such as a gas engine piston, and to that end its inner face is semi-cylindrically recessed or grooved as at 189 so as to receive one side of the cylinder. A complemental clamp member 190 for engaging the other side of the cylinder is pivoted at one bifurcated end upon a pin 191 mounted in a stud 192. A reduced portion of the stud extends through the work holder and is provided on its threaded end with a nut 193. A spring 194 is interposed between the nut and the face of the work holder so as to draw the stud yieldingly to the right. The opposite end of the clamp member 190 is bifurcated to receive a stud 195, upon the end of which is a crossbar 196, which, when turned at right angles to the clamp, engages the end thereof and holds it in position. This is done by the operator manually after the clamp has been moved into place. The stud 195 projects forwardly through the work holder and its forward end is threaded so as to be engaged by a nut 197. A spring 198 is located between the inner face of the work holder and a collar 199 on the stud 195 so as to hold the nut firmly against the face of the work holder. By the means thus described, the work may be clamped to the holder so that the holes or bores therein are substantially alined with the tool spindles and that the latter may be caused to enter the bores as shown in Figure 16. The work holder is positioned and located by what may be termed a "face bearing" within the work carrier. To this end, the work carrier is provided with an annular ball race 200, having in its vertical inner face a ball groove 201 which is complemental to a like groove 202 formed in the inner face of the work holder which thus also constitutes a ball race. The anti-friction balls 203, which are arranged to engage the two races, are held apart by ring spacers 204. The work holder is drawn yieldingly to the left in Figure 16 with sufficient pressure to hold it firmly against the anti-friction balls and thus to center the work holder and prevent its dislocation either axially or laterally. For this purpose, in the present instance I have shown an annular gib 205 which is secured to the work carrier by a series of bolts 206 passing through the gib and the carrier and having on their ends nuts 207 arranged in recesses formed in the work carrier. Springs 208 are arranged in the recesses to bear against the ends thereof and against the nuts 207 so as to draw the heads of the bolts to the left and thereby yieldingly press the gib toward the work carrier axially of the rotation of the work holder. The work holder member 185 is provided with a circumferential or peripheral flange 209 between which and the gib 205 are placed anti-friction balls 210 in a suitable spacer ring 211. By the means thus described, the work holder is drawn yieldingly axially of the center of rotation thereof toward the work carrier and against the balls 203. The main ball bearing is protected against the entrance of grit or metal particles by a guard sleeve 212 which is inserted in the aperture of the work carrier and extends into a recess 213 in the inner face of the work holder. The ball race 200 may be formed as an integral part of the work carrier but preferably it is formed separately and secured in place by screws 214.

From the description thus given, it will be observed that the work holder, which is substantially in the form of a disk or annulus, may be rotated for the purpose of rotating the work that is clamped thereto, and that it has a face bearing which controls and holds it against axial or transverse dislocation. I desire to have it understood, of course, that, while the work holder embodies features of invention and improvement which so far as I am aware are novel, nevertheless the invention as a whole is not limited thereto, as it is quite evident that the machine may be provided with any suitable form of work holder supported by the stationary work carrier in position to permit the tools to operate thereon. Instead of having both tools operate upon a single piece of work, it is obvious of course that two pieces of work may be clamped in the work holder so that the tools may operate thereon. For example, it is quite evident that, if the piece of work which I have illustrated were formed in complemental halves, it might be accurately clamped and held in the work holder with the particular mechanism shown for that purpose. Of course the work holder itself must be apertured to permit the passage of one of the tools therethrough to engage the work, and for this purpose there is a hole indicated at 215. Likewise, if the clamp member 190 is in the path of the other tool, it too must be apertured or so formed as indicated at 216 to permit the tool to pass it. Of course these apertures must be of sufficient diameter to permit the cross-feed of the tools relatively to the work and to receive such grinding wheels of such size as may be placed upon the grinding spindles for operating on the work.

In a machine of this character, it is highly essential that the tools shall be dressed from time to time to maintain their accuracy of operation upon the work. I provide a simple mechanism by which this may be accomplished. A diamond holder may be arranged as shown in Figures 2 and 15. It is illustrated as a simple bar 217 which is mounted to slide lengthwise of and be clamped on a stationary stud 218 mounted in a boss in the work carrier. The diamond itself, which is indicated at 219, is mounted on the end of a cross-pin 220 which is slidable transversely of the bar 217 and which may be clamped in position. Thus the diamond may be adjusted in intersecting lines at the will of the operator and may be employed for dressing wheels of different diameters. The tool carriers are swung rearwardly and upwardly to bring the tools in proper relation to the dressing mechanism, and, when in this position, they are held against movement by an attachment which normally is in inactive position. This attachment comprises a frame 221 (see Figures 2 and 3) whose lower bifurcated end is secured upon a shaft 222 extending through the bed from the rear to the front thereof. This shaft has a handle 223 by which it may be rocked to move the frame 221 from the position shown in Figure 2 to an upright position shown in Figure 3. The free end of the frame has a pin 224 which may be caused to enter in a socket member 225 affixed to the rear wall of the bed. The shaft 222 is slidable rearwardly against the tension of a spring 226 arranged between one of the yoke arms of the frame and the rear bearing 227 for the shaft, so that the frame, as it is being swung from horizontal to vertical position, may be moved rearwardly until the pin 224 registers with the socket in the socket member 225, whereupon the spring 226 forces the shaft 222 and the frame 221 forwardly so as to cause the pin to enter the socket and thereafter hold the frame against swinging movement in its vertical position. When it is in this position, the template 156 on the arm 155 attached to the work carrier 39 engages the end of the frame and thus locates the grinding wheel in potential dressing relation to the dressing tool. The dressing tool being adjusted to proper position, the main tool slide may now be traversed to cause the diamond to dress the wheel, this traverse of the main tool slide being effected preferably manually by the rotation of the hand wheel 212. During this traverse of the tool slide, the frame 221 may be cross-fed by the same mechanism which effects the cross-feed of the tools during the grinding operation. For this purpose, the frame 221 is formed with a face 228, which, when the frame is in vertical position, engages the shoe 157 on the screw bar 158, so that, by feeding the screw bar, the tool may be fed relatively to the diamond or dressing mechanism. In actual practice, when it is desired to dress one or the other of the grinding wheels, the frame 221, which normally lies in a horizontal position, is raised to a vertical position, the operator in the meantime having swung the tool carriers rearwardly and upwardly; and, after the template 156 is permitted to rest upon the end of the frame, the operator then adjusts the diamond so as to engage the grinding surface of the wheel; and then, by operating the traversing and cross-feeding mechanism of the machine, the operator is able to dress the wheel with great accuracy.

In order that the arm 155 may be held upward temporarily, the tool carrier 39 is provided with an elongated inclined bolt 229 having a handle 230, and a lower end which may be projected into the path of the arm and engaged with a face 231, as shown in Figure 3. While for convenience the arm 155 is secured to one of the tool carriers 39, it is not necessarily a component part of said carrier, as it could, of course, be rigidly affixed to the cylindrical tool slide 35, since its function in part is to effect the movement of said slide about its axis and thus cause a feeding movement of the tool carriers. The tool carriers, as previously indicated, may be regarded as arms hung and clamped at one end upon the tool slide with the tool spindles located in the outer or free ends of the arms and arranged lengthwise of the slide but longitudinally spaced to be located on opposite sides of a work holder. While the tool carriers might, if desired, be loosely hung on the slide so as to be capable of independent swinging movement, and each be provided with an arm as at 155 to ride along a template, I should not regard such an arrangement as desirable in many respects as the one herein illustrated, in which both arm-like tool carriers are clamped rigidly to the tool slide so as to partake simultaneously in any angular or rotative movement of said slide, since in the latter case a greater accuracy of control is afforded.

The weight of the arm 155 is partially counter-balanced by bars 232, having adjustable weights 233 thereon, said bars being secured to the tool carriers in any suitable manner.

In the foregoing description, in using the terms "horizontal", "vertical" and the like, of course it will be understood that these are relative terms selected for convenience in description,—merely for the reason that in the particular machine as illustrated the work happens to be rotated about a horizontal axis. Of course, if the work were arranged to rotate about a vertical axis, the same relationship of parts could be maintained by causing the tool carriers likewise to swing about a vertical axis and to reciprocate up and down in their traversing movement. Consequently, by the employment of the terms referred to, I do not mean to limit myself to the horizontally-arranged machine which represents only one embodiment of the invention. Furthermore I would not consider it a departure from the invention set forth in the claims if the grinding wheels were supported by the bed and the work were hung from the main slide 35. In this event, the cross-feed as well as the longitudinal feed would be effected by moving the work instead of by moving the grinding tools.

Having thus explained the nature of my said invention and described a way of making and using the same, although without attempting to set forth all of the forms in which it may be made or all of the modes of its use, what I claim is:—

1. A grinding machine comprising longitudinally-spaced spindles, grinding wheels thereon, a reciprocatory main tool slide, carriers for said spindles affixed to said slide so as to be moved thereby, and mechanism for actuating said slide.

2. A grinding machine comprising a reciprocatory main tool slide, tool carriers secured to said slide and movable thereby, longitudinally-spaced grinding wheels and spindles mounted on said carriers, mechanism for actuating said slide, and means for supporting and rotating the work to be operated on by said grinding wheels.

3. A grinding machine comprising oppositely-arranged longitudinally-spaced spindles having grinding wheels on their inner ends, a reciprocatory main tool slide, and tool carriers on which said spindles are journaled affixed to said main slide and movable simultaneously therewith in the same direction.

4. A grinding machine comprising longitudinally-spaced spindles, grinding wheels thereon, a main tool slide, carriers for said spindles affixed to said slide, and mechanism for actuating said slide to move said carriers transversely and longitudinally of the axes of said spindles.

5. A grinding machine comprising a bed, a reciprocatory main tool slide movable longitudinally of said bed, longitudinally-spaced substantially-alined spindles having grinding wheels thereon, supporting means for said spindles affixed to said slide, and means for reciprocating said slide to move said spindles in lines longitudinal thereof and in the same direction.

6. A grinding machine comprising a bed, a main tool slide movable longitudinally of said bed, longitudinally-spaced substantially-alined spindles having grinding wheels thereon, supporting means for said spindles affixed to said slide, means for reciprocating said slide to move said spindles in lines longitudinal thereof, and means for actuating said slide and spindles to cause said spindles to move transversely of their axes.

7. A grinding machine comprising longitudinally-spaced spindles, grinding wheels thereon, a main tool slide, a bed on which said slide is mounted both to slide and to move about an axis, and carriers for said spindles affixed to said slide.

8. A grinding machine comprising a bed, longitudinally-spaced spindles, grinding wheels thereon, a cylindrical main tool slide mounted on said bed, and tool carriers hung on said slide to be actuated thereby and supporting said spindles.

9. A grinding machine comprising a bed, longitudinally-spaced spindles, grinding wheels thereon, a cylindrical main tool slide mounted on said bed, tool carriers hung on said slide to be actuated thereby and supporting said spindles, means for moving said slide axially to move said carriers and spindles simultaneously longitudinally of said spindles, and means for moving said carriers transversely of the axes of said spindles about the axis of said cylindrical main tool slide.

10. A grinding machine comprising a bed, a rotatable work holder supported by said bed, longitudinally-spaced spindles on opposite sides of said work holder and having grinding tools thereon, means for simultaneously reciprocating said spindles lengthwise during the operation of the tools on the work, and means for moving said spindles longitudinally toward and from each other into and out of operative relation to the work on said work holder.

11. A grinding machine comprising a bed, a rotatable work holder supported by said bed, longitudinally-spaced spindles on opposite sides of said work holder and having grinding tools thereon, means for simultaneously reciprocating said spindles lengthwise during the operation of the tools on the work, means for moving said spindles longitudinally toward and from each other into and out of operative relation to the work on said work holder, and mechanism for effecting a relative feeding movement of said work holder and said spindles transversely of said spindles.

12. A grinding machine comprising a bed, a rotatable work holder supported by said bed, longitudinally-spaced spindles on opposite sides of said work holder and having grinding tools thereon, carriers for said spindles, a main tool slide to which said carriers are secured, means for actuating said tool slide to move the spindles simultaneously in longitudinal lines, and mechanism for effecting a longitudinal relative separating and closing movement of said spindles.

13. A grinding machine comprising a bed, a rotatable work holder supported by said bed, longitudinally-spaced spindles on opposite sides of said work holder and having grinding tools thereon, means for simultaneously reciprocating said spindles lengthwise during the operation of the tools on the work, means for moving said spindles longitudinally toward and from each other into and out of operative relation to the work on said work holder, and means for moving one of the spindles transversely relatively to the other.

14. A grinding machine comprising a bed, a rotatable work holder supported by said bed, longitudinally-spaced spindles on opposite sides of said work holder and having grinding tools thereon, means for simultaneously reciprocating said spindles lengthwise during the operation of the tools on the work, means for moving said spindles longitudinally toward and from each other into and out of operative relation to the work on said work holder, means for moving one of the spindles transversely relatively to the other, and means for feeding said spindles simultaneously transversely of their axes.

15. A grinding machine comprising a bed, a rotatable work holder supported by said bed, longitudinally-spaced spindles on opposite sides of said work holder and having grinding tools thereon, carriers for said spindles, a main tool slide to which said carriers are secured, means for actuating said tool slide to move the spindles simultaneously in longitudinal lines, mechanism for effecting a longitudinal relative separating and closing movement of said spindles, means for moving one of said carriers relatively to the other to bring the spindle carried thereby into or out of axial alinement with the other spindle, and means for feeding said carriers transversely of said spindles.

16. A grinding machine comprising a bed, longitudinally-spaced spindles, grinding wheels thereon, a cylindrical main tool slide mounted on said bed, tool carriers hung on said slide to be actuated thereby and supporting said spindles, mechanism for reciprocating said slide to actuate said carriers simultaneously, and means for moving said spindles axially toward and from each other.

17. A grinding machine comprising a bed, longitudinally-spaced spindles, grinding wheels thereon, a cylindrical main tool slide mounted on said bed, tool carriers hung on said slide to be actuated thereby and supporting said spindles, and means for adjusting one of said carriers relatively to the other about the axis of said slide.

18. A grinding machine comprising a bed, longitudinally-spaced spindles, grinding wheels thereon, a cylindrical main tool slide mounted on said bed, tool carriers hung on said slide to be actuated thereby and supporting said spindles, means for adjusting one of said carriers relatively to the other about the axis of said slide, and mechanism for feeding said carriers simultaneously about the axis of said slide.

19. A grinding machine comprising a bed, a tool slide mounted to slide on said bed and to oscillate about its longitudinal axis, longitudinally-spaced tool carriers hung on said slide and secured thereto to be moved thereby, mechanism for adjusting one of said carriers relatively to the other about the axis of said tool slide, and mechanism for feeding both carriers about the axis of said slide.

20. A grinding machine comprising a bed, a tool slide mounted to slide on said bed and to oscillate about its longitudinal axis, longitudinally-spaced tool carriers hung on said slide and secured thereto to be moved thereby, mechanism for adjusting one of said carriers relatively to the other about the axis of said tool slide, mechanism for feeding both carriers about the axis of said slide, and mechanism for reciprocating said slide and thereby said carriers.

21. A grinding machine comprising a bed, a tool slide supported in bearings in said bed, a tool carrier hung on said slide and adjustably fixed thereto, and mechanism for positively adjusting said carrier angularly about said slide.

22. A grinding machine comprising a bed, a tool slide supported in bearings in said bed, tool carriers hung on said slide and rigidly secured thereto, mechanism for positively adjusting one of said carriers angularly about said slide relatively to the other and mechanism for moving said slide about its axis to cause a feeding movement of said carriers simultaneously.

23. A grinding machine comprising a bed, a tool slide supported in bearings in said bed, tool carriers hung on said slide and rigidly secured thereto, mechanism for positively adjusting one of said carriers angularly about said slide relatively to the other, mechanism for moving said slide about its axis to cause a feeding movement of said carriers simultaneously, and mechanism for reciprocating said slide and thereby said carriers.

24. A grinding machine comprising a rotary work holder, a pair of axially-spaced grinding wheels on opposite sides of the work holder, and mechanism for moving said wheels axially simultaneously in the same direction.

25. A grinding machine comprising a rotary work holder, a pair of axially-spaced grinding wheels on opposite sides of the work holder, mechanism for moving said wheels axially simultaneously in the same direction, and mechanism for advancing and withdrawing said wheels axially toward and from each other.

26. A grinding machine comprising a rotary work holder, a pair of axially-spaced grinding wheels on opposite sides of the work holder, mechanism for moving said wheels axially and simultaneously, mechanism for advancing and withdrawing said wheels axially toward and from each other, and mechanism for simultaneously feeding said wheels transversely of their axes.

27. A grinding machine comprising a rotary work holder, a pair of axially-spaced grinding wheels on opposite sides of the work holder, mechanism for moving said wheels axially and simultaneously, mechanism for advancing and withdrawing said wheels axially toward and from each other, and mechanism for moving one of said wheels transversely of its axis relatively to the other wheel.

28. In a grinding machine, a pair of spaced tool carriers, a spindle, a grinding wheel, and a tool holder for the spindle on each carrier, mechanism for simultaneously moving said carriers axially of said spindles, and mechanism for moving one of said tool holders axially of its spindle relatively to its associated carrier.

29. In a grinding machine, a bed, a main tool slide mounted to slide on said bed, tool carriers supported on said slide, a spindle on each of said carriers having a grinding tool, a spindle holder on each carrier in which the associated spindle is journaled, and mechanism for moving one of said tool carriers and the spindle holder of the other carrier in opposite directions to advance and withdraw the said spindles toward and from each other.

30. In a grinding machine, spaced tool carriers; a grinding tool, a spindle, and a spindle sleeve or holder mounted on each carrier, said spindles extending in the same lengthwise directions and the grinding wheels being on the adjacent ends of said spindles; a hollow oscillatory tool slide to which said tool carriers are secured at spaced portions of its length; and mechanism extending in part through said hollow tool slide for moving one of said spindle sleeves or holders lengthwise relatively to its associated carrier.

31. In a grinding machine, a hollow tool slide, a tool carrier thereon, a sleeve or spindle holder mounted on said carrier, a tool spindle journaled in said sleeve, a movable member within the hollow tool slide, and power-transmitting mechanism between said member and said spindle holder, for moving said spindle holder relatively to said carrier.

32. In a grinding machine, a tubular tool slide, an armlike carrier fixed to said tool slide, a tool spindle, a sleeve or holder for said spindle mounted on the free end of said carrier, a longitudinally movable member located in said tubular tool slide, and power-transmitting mechanism operable by said member to move said sleeve or holder on said carrier.

33. In a grinding machine, a tool carrier, a tool spindle holder movable thereon, a tool spindle mounted on said carrier, a movable rack bar, and mechanism actuated by said rack bar for moving said spindle holder relatively to said carrier in lines longitudinal of the spindle.

34. In a grinding machine, a bed, a tool slide movable on said bed, a spindle holder supported by said slide and arranged longitudinally thereof, a tool spindle journaled in said holder, and mechanism for moving said tool slide relatively to said bed and said spindle holder relatively to said slide in opposite directions longitudinally of said spindle.

35. In a grinding machine, a bed, a tubular slide mounted on said bed, a rack bar within said slide, mechanism for effecting a relative lengthwise movement of said slide and bar, and stop members on the bed for engagement with said bar, whereby the actuation of said mechanism first causes a movement of said bar relatively to said slide and then a movement of said slide relatively to said bar.

36. In a grinding machine, a bed, a tubular slide mounted on said bed, a rack bar within said slide, mechanism for effecting a relative lengthwise movement of said slide and bar, and stop members on the bed for engagement with said bar, whereby the actuation of said mechanism first causes a movement of said bar relatively to said slide and then a movement of said slide relatively to said bar; in combination with a tool carrier secured to said slide, a spindle holder mounted on said carrier, and power-transmitting mechanism between said bar and spindle holder, by which the relative movement of said bar or said slide is transmitted to said spindle holder to move it relatively to said carrier.

37. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, and tool spindles journaled on said arms and projecting in opposite directions toward said work holder.

38. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, and mechanism for reciprocating said slide.

39. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, and mechanism for moving said slide about the axis of its bearings to feed the tool spindles transversely of the axis of said work holder.

40. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, and mechanism for causing said spindles to advance and recede axially toward and from each other.

41. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, mechanism for reciprocating said slide to cause a simultaneous traversing motion of said spindles in the same direction, and mechanism for causing said spindles to advance and recede axially toward and from each other.

42. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, and mechanism for positively adjusting one of said arm-like carriers about said slide, to bring its associated spindle into or out of axial alinement with the spindle on the other carrier.

43. In a grinding machine, a bed, a work carrier supported on said bed between its ends, a rotary work holder journaled to rotate in said work carrier, a tool slide mounted in bearings in said bed and arranged parallel to the axis of said work holder, separated arm-like tool carriers secured to said slide with the work carrier between them, tool spindles journaled on said arms and projecting in opposite directions toward said work holder, mechanism for positively adjusting one of said arm-like carriers about said slide, to bring its associated spindle into or out of axial alinement with the spindle on the other carrier, and mechanism for simultaneously moving both carriers about an axis substantially parallel with the axes of the spindles.

44. In a grinding machine, a grinding tool, a spindle therefor, a tool carrier, a spindle holder mounted in said carrier to be capable of movement longitudinally of said spindle, and mechanism for clamping said holder against movement.

45. In a grinding machine, a grinding tool, a spindle therefor, a tool carrier, a spindle holder mounted in said carrier to be capable of movement longitudinally of said spindle, mechanism for clamping said holder against movement, and gearing on said carrier by which said spindle holder when unclamped may be moved.

46. In a grinding machine, a grinding tool, a spindle therefor, a tool carrier, a spindle holder mounted in said carrier to be capable of movement longitudinally of said spindle and consisting of a sleeve, and mechanism for clamping the end portions of said sleeve to said carrier.

47. In a grinding machine, a grinding tool, a spindle therefor, a tool carrier, a spindle holder mounted in said carrier to be capable of movement longitudinally of said spindle and consisting of a rack-toothed sleeve, and a gear on said carrier engaging said rack-teeth for moving said sleeve.

48. In a grinding machine, a bed, axially-spaced substantially-alined grinding wheels, an annular work carrier on the bed, an annular rotary work holder for holding the work between the grinding wheels so that both may operate thereon, and anti-friction rolls engaging complemental races in confronting faces of said carrier and work holder.

49. In a grinding machine, a bed, a tool spindle, a work carrier fixed on the bed and having a face lying in a plane perpendicular to the axis of said spindle, a rotary circular work holder having a face confronting the last-mentioned face, said faces having complemental ball races, anti-friction balls in said races, and means for securing the work to said work holder.

50. In a grinding machine, a bed, a tool spindle, a work carrier on the bed having a face lying in a plane perpendicular to the axis of said spindle, a rotary circular work holder having a face confronting the last-mentioned face, said faces having complemental ball races, anti-friction balls in said races, and means for yieldingly holding said faces in engagement with said balls.

51. In a grinding machine, a bed, a work carrier on the bed having a face lying in a plane perpendicular to the axis of said spindle, a rotary circular work holder having a face confronting the last-mentioned face, said faces having complemental ball races, anti-friction balls in said races, means for securing the work to said work holder, and tools and tool spindles arranged on both sides of the work holder, all so that the work may be ground by both tools and be held by the face bearing against lateral dislocation during such grinding.

52. In a grinding machine, a rotary work holder having complemental curved faces for receiving and clamping between them cylindrical work with a transverse bore, axially-spaced grinding wheels on both sides of the work holder for grinding said bore, means for rotating said holder about the axis of said bore, means for rotating said grinding wheels, means for effecting a relative transverse feed of said work holder and said grinding wheels, and means for effecting a relative traversing movement of said work holder and said grinding wheels.

53. A grinding machine comprising a bed, a rotatable work holder, longitudinally-spaced spindles on opposite sides of the work holder and having grinding tools thereon, means for effecting a longitudinal relative separating movement of said spindles, and mechanism for effecting a relative longitudinal reciprocation and a transverse movement of the tool spindles and the work holder.

In testimony whereof I have affixed my signature.

WILLIAM LE ROY BRYANT.

46. In a grinding machine, a grinding tool, a spindle therefor, a tool carrier, a spindle holder mounted in said carrier to be capable of movement longitudinally of said spindle and consisting of a sleeve, and mechanism for clamping the end portions of said sleeve to said carrier.

47. In a grinding machine, a grinding tool, a spindle therefor, a tool carrier, a spindle holder mounted in said carrier to be capable of movement longitudinally of said spindle and consisting of a rack-toothed sleeve, and a gear on said carrier engaging said rack-teeth for moving said sleeve.

48. In a grinding machine, a bed, axially-spaced substantially-alined grinding wheels, an annular work carrier on the bed, an annular rotary work holder for holding the work between the grinding wheels so that both may operate thereon, and anti-friction rolls engaging complemental races in confronting faces of said carrier and work holder.

49. In a grinding machine, a bed, a tool spindle, a work carrier fixed on the bed and having a face lying in a plane perpendicular to the axis of said spindle, a rotary circular work holder having a face confronting the last-mentioned face, said faces having complemental ball races, anti-friction balls in said races, and means for securing the work to said work holder.

50. In a grinding machine, a bed, a tool spindle, a work carrier on the bed having a face lying in a plane perpendicular to the axis of said spindle, a rotary circular work holder having a face confronting the last-mentioned face, said faces having complemental ball races, anti-friction balls in said races, and means for yieldingly holding said faces in engagement with said balls.

51. In a grinding machine, a bed, a work carrier on the bed having a face lying in a plane perpendicular to the axis of said spindle, a rotary circular work holder having a face confronting the last-mentioned face, said faces having complemental ball races, anti-friction balls in said races, means for securing the work to said work holder, and tools and tool spindles arranged on both sides of the work holder, all so that the work may be ground by both tools and be held by the face bearing against lateral dislocation during such grinding.

52. In a grinding machine, a rotary work holder having complemental curved faces for receiving and clamping between them cylindrical work with a transverse bore, axially-spaced grinding wheels on both sides of the work holder for grinding said bore, means for rotating said holder about the axis of said bore, means for rotating said grinding wheels, means for effecting a relative transverse feed of said work holder and said grinding wheels, and means for effecting a relative traversing movement of said work holder and said grinding wheels.

53. A grinding machine comprising a bed, a rotatable work holder, longitudinally-spaced spindles on opposite sides of the work holder and having grinding tools thereon, means for effecting a longitudinal relative separating movement of said spindles, and mechanism for effecting a relative longitudinal reciprocation and a transverse movement of the tool spindles and the work holder.

In testimony whereof I have affixed my signature.

WILLIAM LE ROY BRYANT.

---

Certificate of Correction.

Patent No. 1,624,211.     Granted April 12, 1927, to

WILLIAM LE ROY BRYANT.

It is hereby certified that error appears in the printed specification of the above-numbered patent requiring correction as follows: Page 1, in the heading, title of invention, for "Multispindle Internal-Combustion Machine" read *Multispindle Internal-Grinding Machine;* and that the said Letters Patent should be read with this correction therein that the same may conform to the record of the case in the Patent Office.

Signed and sealed this 10th day of May, A. D. 1927.

[SEAL.]     M. J. MOORE,
*Acting Commissioner of Patents.*

Certificate of Correction.

Patent No. 1,624,211. Granted April 12, 1927, to

WILLIAM LE ROY BRYANT.

It is hereby certified that error appears in the printed specification of the above-numbered patent requiring correction as follows: Page 1, in the heading, title of invention, for " Multispindle Internal-Combustion Machine " read *Multispindle Internal-Grinding Machine;* and that the said Letters Patent should be read with this correction therein that the same may conform to the record of the case in the Patent Office.

Signed and sealed this 10th day of May, A. D. 1927.

[SEAL.]
M. J. MOORE,
*Acting Commissioner of Patents.*